(No Model.)

C. F. RITCHEL.
COP WINDER.

No. 249,484. Patented Nov. 15, 1881.

WITNESSES
H. Engel
Jno. Crowell Jr.

INVENTOR
Charles F. Ritchel
By Leggett & Leggett
ATTORNEYS

UNITED STATES PATENT OFFICE.

CHARLES F. RITCHEL, OF BRIDGEPORT, CONNECTICUT, ASSIGNOR TO THE WHITE SEWING MACHINE COMPANY, OF CLEVELAND, OHIO.

COP-WINDER.

SPECIFICATION forming part of Letters Patent No. 249,484, dated November 15, 1881.

Application filed June 23, 1881. (No model.)

*To all whom it may concern:*

Be it known that I, CHARLES F. RITCHEL, of Bridgeport, in the county of Fairfield and State of Connecticut, have invented certain new and useful Improvements in Cop-Winders; and I do hereby declare the following to be a full, clear, and exact description of the invention, such as will enable others skilled in the art to which it pertains to make and use it, reference being had to the accompanying drawings, which form part of this specification.

My invention relates to a device for winding thread in cops for use in sewing-machine shuttles; and it consists in certain features of construction and combination of parts, as will hereinafter be described, and pointed out in the claim.

Figure 1:
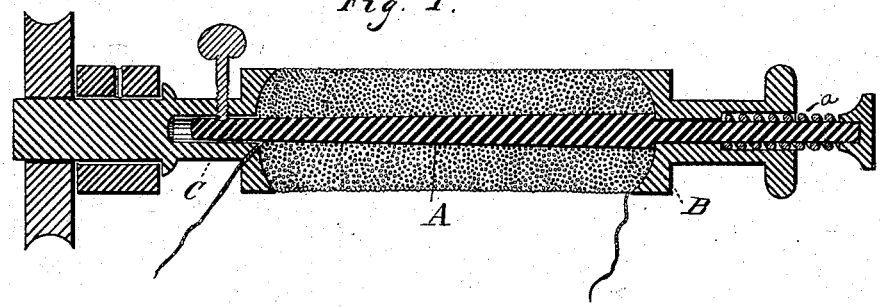
Figure 2:
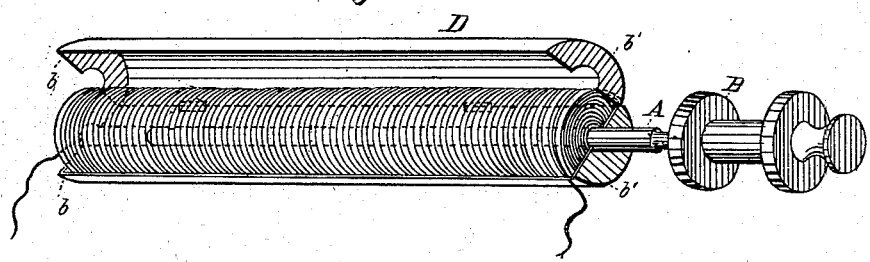
Figure 3:
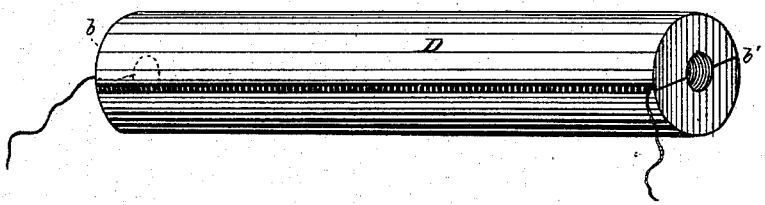
Figure 4:
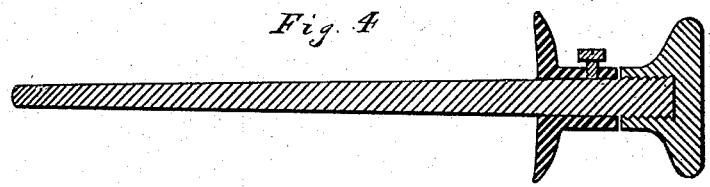

In the drawings, Figure 1 is a longitudinal section of my device, showing the manner of winding the thread and of securing the mandrel in the chuck. Fig. 2 is a view showing the case and the manner of placing the cop therein. Fig. 3 shows the cop-case closed and ready to be placed in the shuttle. Fig. 4 shows another manner of forming the mandrel and washer.

A is a mandrel, which is made tapering.

B is a movable washer, which is made concave on its inner face, and may be provided with a handle, as shown.

$a$ is a spiral spring, which serves to keep the washer B in place against the shoulder on the mandrel A and allow it to be drawn back when desired.

C is a chuck, which is also made concave on its face, as shown, and by means of which the mandrel A is revolved.

D is the cop-case, which is made cylindrical in shape and formed in two parts, which are hinged together at the back.

$b\ b'$ are the ends of the cop-case, and are provided with holes in their centers large enough to admit the mandrel A.

The operation of the device is as follows: One end of the mandrel A is secured in the chuck C by means of a thumb-screw or in any suitable manner, and one end of the thread to be wound may be threaded through a hole in the chuck, as shown in Fig. 1, or it may be secured in any suitable manner so as to revolve with said mandrel. Rotary motion is then imparted to the mandrel A by means of the chuck C, and the thread fed to the said mandrel and wound into a cop. It will be noticed that the inner faces of the chuck C, and also that of the movable washer B, are made concave. The reason for this is to make each succeeding coil shorter than the one below it, and thus prevent the ends of the cop from falling apart when their support is removed, as they would be apt to do were the coils of the same length. After the thread is wound the mandrel is removed from the chuck C, and the movable washer B is pulled back, as shown in Fig. 2, and the cop placed within the case D, leaving the inner end of the thread projecting out through the hole in the center of the end $b$. The case is now closed, and the mandrel, being of a tapering form, is easily removed from the center of the cop without disturbing the thread. The front of the cop-case is provided with a slot which allows the outer end of the thread to project, and prevents this end from entangling when the thread is almost all run out. Thus the thread, being drawn from the center through the hole in the end $b$ of the cop-case, is fed as it is needed, and the necessity of a bobbin is obviated.

When it is desired to use the cop without the case the washer B may be made in such a manner that the mandrel A will pass through it, thus leaving said washer B to support the end of the cop while the mandrel is being withdrawn. This washer may be fastened to the mandrel by means of a thumb-screw, as shown in Fig. 4, or in any other suitable manner.

What I claim is—

The combination, with the mandrel A, movable washer B, having a concave face, and means for holding said washer in place on the mandrel, of the chuck C, having a concave face, the said concave faces of the washer and chuck being arranged to impart convex ends to the cop, substantially as set forth.

In testimony whereof I have signed my name to this specification in the presence of two subscribing witnesses.

CHARLES FRANCIS RITCHEL.

Witnesses:
WILLIS N. BRONSON,
DWIGHT H. TERRY.